UNITED STATES PATENT OFFICE.

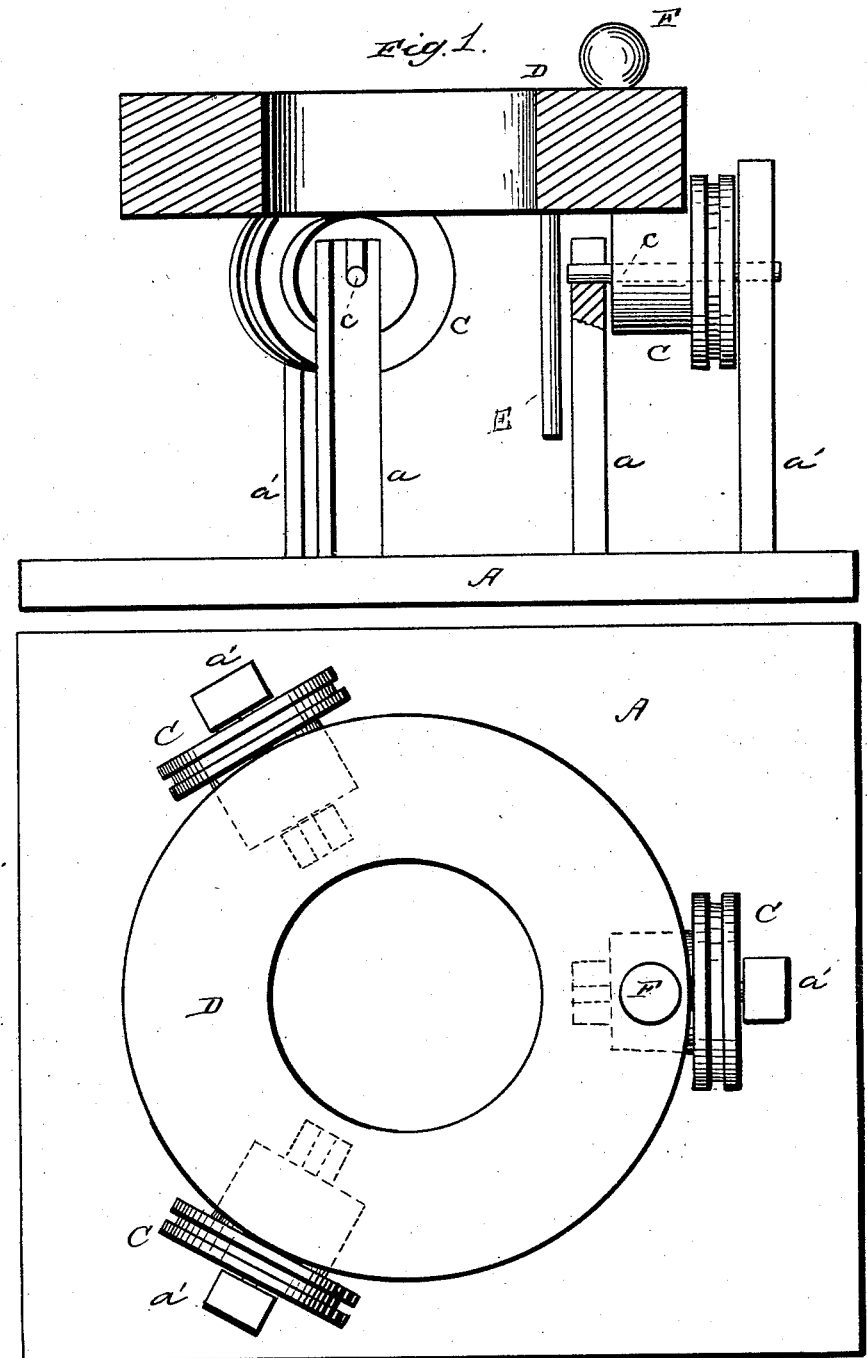

JAMES A. ADAMS, OF FALCON, TENNESSEE.

HORSE AND HAND POWER.

SPECIFICATION forming part of Letters Patent No. 285,198, dated September 18, 1883.

Application filed July 11, 1883. (No model.)

*To all whom it may concern:*

Be it known that I, JAMES A. ADAMS, a citizen of the United States, residing at Falcon, in the county of McNairy and State of Tennessee, have invented certain new and useful Improvements in Horse and Hand Powers, of which the following is a description.

This invention relates to improvements in horse and hand powers, and has for its object the running of heavy machinery or loads with more ease and expedition than is usually done by the ordinary tread-wheel horse-powers hitherto used, and with one-half the expenditure of power; and to this end my invention consists in the novel construction and arrangement of the several parts, as will be hereinafter more specifically described, and set forth in the claims.

In the annexed drawings, to which reference is made, and which fully illustrate my invention, Figure 1 is a vertical sectional view of my device, and Fig. 2 is a top view of the same.

Like letters refer to like parts in the several views.

A represents the base or platform of my horse and hand power, and from which arise standards or posts $a\ a'$, $a\ a'$, $a\ a'$, six in number, having their lower ends mortised or otherwise secured in said platform, and arranged two by two in series, the whole arranged to form a triangle relatively to the platform or base A, the outer posts, $a'\ a'\ a'$, being somewhat higher or longer than the three inner ones, $a\ a\ a$, said inner posts being provided with slots $b\ b\ b$ in their tops, which form bearings in connection with holes $b'\ b'\ b'$, made in the outer posts or standards near their upper ends for flanged wheels C C C, which are hung and revolve upon axles $c\ c\ c$, between the standards. These flanged wheels C C C are provided with peripheral grooves $d\ d\ d$, for the purpose of holding and retaining therein leather or other suitable belts of the cord type; or the flat belts can be used, either, as may be most convenient in running the machine. The wheels C C C can be made of iron or wood, and of any desirable size, according to the rate of speed required, as the speed is regulated by the size of the wheels. D is a larger and heavier metallic revolving wheel, which revolves at right angles to the smaller wheels, and which is provided with a circular opening in the center thereof large enough for the horses to walk within when operating the same; and upon the under side of this wheel D depends eccentrically a shaft or lever, E, and upon the upper side of this wheel and diametrically opposite to the shaft E, which is on the lower side of the wheel, is a handle or knob, F, the shaft or lever E being the point from which the horses impart power to the wheels, and the knob F being the point from which power is applied by hand for running the machine.

It will be understood from the foregoing description of the machine that all of these wheels are so arranged in relation to each other as to revolve simultaneously, the large wheel D lying loosely on the flanged wheels and being retained in its position thereon by its weight only, care being taken to have the weight of the wheel sufficient for that purpose. The wheels can be so changed in position as to be nearer the ground or base A, in which case the horses walk inside of the wheel D when operating it; and when the wheels are placed higher up on the standards, so as to be above the horses' heads, as shown in the drawings, the shaft or lever depending from the lower side of wheel D is to hitch the horses to, to give motion to the wheels hereinbefore referred to. The large wheel can be made smaller, but of sufficient weight to hold it down on the flanged wheels, in which case the horses walk outside of the wheel D in operating it. Either one or all of these flanged wheels C C C can be used as belt or band wheels, by which I am able to run a house full of machinery, and the heavier the large wheel D the more power there is exerted on the machinery or whatever it may be necessary to run. The machine, when made smaller, can be operated by means of the knob or handle F by hand, and when so operated it will run saws of various kinds, corn-shellers, churns, &c. My device is simple in its construction, cheap to manufacture, and durable.

Having thus fully described my invention, what I claim as new, and desire to secure by Letters Patent, is—

1. In a horse and hand power, the combination of the base A, standards $a\ a'$, $a\ a'$, $a\ a'$, flanged wheels C C C, wheel D, shaft or lever E, and handle F, arranged and operating substantially as described, and for the purposes set forth.

2. The wheel D, placed loosely upon the flanged wheels C C C, and retained in position by its own weight thereon, and arranged at right angles to said wheels, substantially as described, and for the purposes set forth.

JAMES ALIEN ADAMS.

Attest:
W. A. GOOCH,
H. L. PECK.